Jan. 24, 1933.  B. F. JENSEN  1,895,162
DETACHABLE SURE FOOTING APPLIANCE FOR VEHICLE FLOOR COMPARTMENTS
Filed Jan. 20, 1932
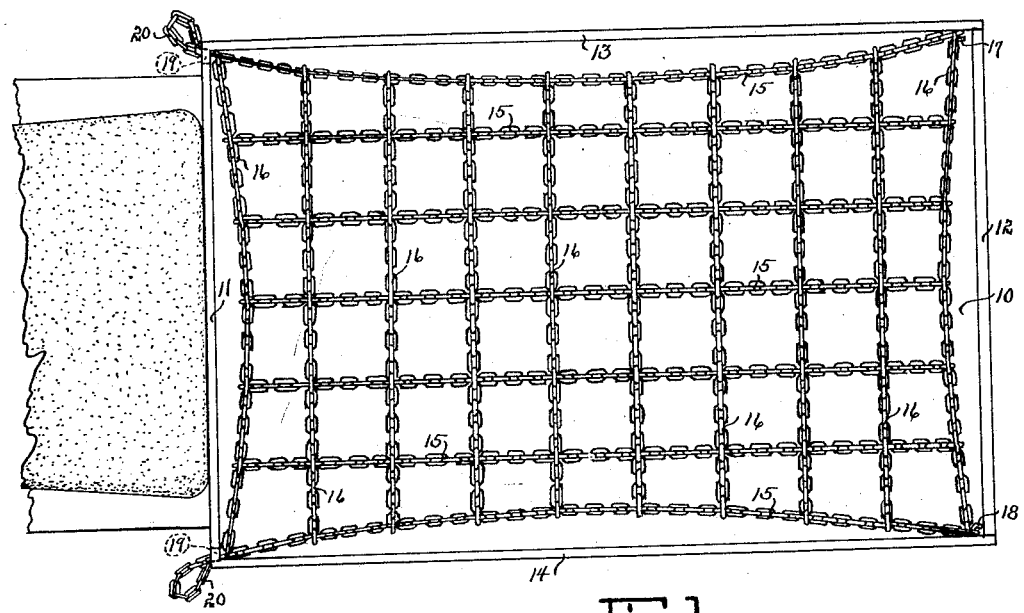
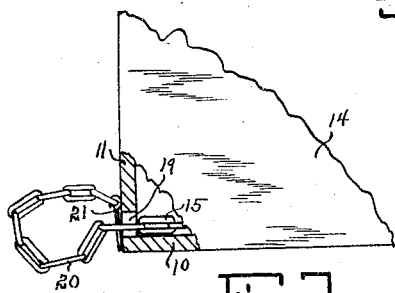
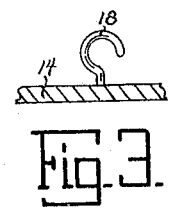
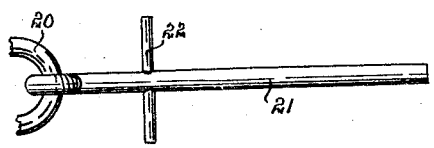
INVENTOR.
B. F. JENSEN
BY M. Talbert Dick
ATTORNEY.

Patented Jan. 24, 1933

1,895,162

UNITED STATES PATENT OFFICE

BENTON FRANKLIN JENSEN, OF EXIRA, IOWA

DETACHABLE SURE-FOOTING APPLIANCE FOR VEHICLE FLOOR COMPARTMENTS

Application filed January 20, 1932. Serial No. 587,679.

The principal object of my invention is to produce an anti-skid net covering for the stock-hauling compartment floors of vehicles such as trucks, railroad cars, and the like, that provides stable traction for the feet of the live animals being transported.

A further object of this invention is to provide a device for rendering suitable non-skid traction facilities on the bottom of vehicle stock-hauling compartments that may be easily and quickly attached or detached.

A still further object of my invention is to provide a detachable sure-footing appliance for stock-hauling vehicle floor compartments that requires no operation expense after once installed.

A still further object of this invention is to provide a sure-footing apparatus for the stock-hauling compartment floors of vehicles that may be easily and quickly cleaned and kept in a sanitary condition.

A still further object of my invention is to provide a detachable sure-footing appliance for the compartment of vehicle floors that does not materially wear or mar the floor.

A still further object of this invention is to provide an anti-skid covering appliance for vehicle-hauling compartment floors, that is of light weight and always available for instant use.

A still further object of my invention is to provide a detachable sure-footing appliance for vehicle floor compartments that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompany drawing, in which:

Fig. 1 is a top plan view of my invention installed on the floor of the hauling compartment of a vehicle ready for use.

Fig. 2 is a side view in section of a vehicle compartment corner showing my device attached thereto.

Fig. 3 is a top plan view of one of the vehicle hook members to which one corner of the appliance is designed to be attached.

Fig. 4 is a view of the chain net at a point where two strands of the chain intersect.

Fig. 5 is an enlarged side view of one of the attaching and securing chains.

The transporting of animals such as cows, horses, hogs and like by moving vehicles provokes a number of problems. No doubt the chief problem is the preventing of injury to the animals in transit.

The yearly losses from such injuries are tremendous, and are principally caused by the animals slipping or skidding on the slick wet floor of the vehicle. Naturally the swaying of the vehicle when in motion demands that the animals have foot traction. The usual method employed is to put gravel, cinders, straw or other abrasive elements in the bottom of the hauling compartment. Such shiftable coverings however, are dissipated, are hard on the floor and are soon wet and inefficient. They are also costly as it is necessary to change to new material frequently, and this material is not always available. I have overcome all such difficulties by providing a novel chain net for the floor of the hauling compartment.

I have used the numeral 10 to designate the usual bottom of a rectangular box for hauling stock such as found on trucks. The numeral 11 designates the front end and the numeral 12 designates the rear end of the box. The numeral 13 designates the right side and the numeral 14 the left side of the box.

My appliance chiefly consists of a plurality of strands of longitudinal chains 15 and a plurality of cross or transversely arranged strands of chains 16, as shown in Fig. 1. These chains may be secured together where they cross each other by any suitable means. However, I strongly recommend that at the point where two strands of chains cross each other that the link in one of the chains be spread as shown by dotted lines in Fig. 4, and while so spread the other chain threaded through it. After the chains have so been threaded with each other, the spread links should then be compressed to their normal positions, thereby preventing any further sliding of the chains through each other. This means of securing the chains together where they cross each other is extremely efficient, economical and durable.

Also when such a method is used, the complete chain net will lie flat on the bottom 10, which would not be the case if some of the chains crossed over other chains and did not lie all in the same plane. It will here be noted that the central strands of chain 16 are progressively shorter in length than the length of these chains 16 at each side thereof. By this construction the outer side chains 15 will bow in at their centers as shown in Fig. 1. In the drawing I also show the central strand of chain 15 of a length progressively less than the lengths of the chains 15 at each side of it. This construction will also cause the two outer side chains 16 to bow inwardly near their centers similar to the two outer side chains 15.

The outer dimensions of the chain net should be sufficient to approximately cover the bottom 10 of the box. The numeral 17 designates a rearwardly extending hook member secured to the side 13 and positioned adjacent the bottom 10 and in close proximity to the rear end 12 of the box. The numeral 18 designates a similar rearwardly extending hook member secured to the side 14 and positioned adjacent the bottom 10 and in close proximity to the end 12.

The numeral 19 designates two spaced apart holes in the front end 11. These two holes 19 are adjacent the bottom 10 and in close proximity to the two sides 13 and 14 respectively. The numeral 20 designates a length of additional links on the forward end of each of the two side chains 15 as shown in Fig. 1 and Fig. 2. Secured to the outer link of each of the chain links 20 is a pin which I have designated by the numeral 21. The numeral 22 designates a small engaging bar transversely extending through each of the pins 21 as shown in Fig. 5.

To attach the device it is merely necessary to hook the rear end link of the two outer chains 15 onto the two hook members 17 and 18 respectively. Next the portions 20 of the two outer chains 15 are passed through the two holes 19 respectively. After the portions 20 have been pulled tightly through the holes 19, the pins 21 secured to them should be dropped through the links barely emerging through the holes 19 as shown in Fig. 2, thereby tightly securing the chain net on the bottom 10 against movement. The bar 22 on each of the pins 21 prevents the pins from completely dropping through the links they are engaging. With the chain net rigidly secured over the bottom 10, excellent traction for the feet of the animals will be provided. By having the central chains 16 of a length progressively less than the chains 16 at each side thereof, the tightening of the two outer chains 15 will automatically tighten these cross chains 16. From one end of the box to the other end of the box, due to the fact that the tightening of these chains 15 will tend to straighten them from inwardly bowed lines to straight lines. Furthermore, the tightening of the two outer chains 15 by tightening the front cross chain 16 will also tighten the central chains 15, due to the fact that the central chains 15 are of short construction, as herebefore explained. If the side chains 15 cannot be pulled tight enough to suit the user, he may use any suitable tool such as a claw hammer to facilitate the operation.

To remove the appliance it is merely necessary to detach the pins 21 from the links and allow the portions 20 to be drawn into the box through the holes 19. Although other members besides strands of chains may be used, metallic link chain is recommended due to its traction and self-cleaning qualities. When a metallic chain net is used it may be easily washed and kept in a clean and sanitary condition.

If material is allowed to dry on the chains, the shaking of the flexible chains will break the dried clinging matter from the chains.

My compact chain net may be easily stored or hung up in the vehicle when not in actual use.

From the foregoing it will readily be seen that I have provided a sure-footing appliance for hauling compartment floors that may be easily attached or detached and provides continuous uniform service.

Some changes may be made in the construction and arrangement of my improved detachable sure-footing appliance for vehicle floor compartments, without departing from the real spirit and purpose of my invention, and it is my intention to cover by my claims any modified forms of structure or use of mechanical equivalents which may be reasonably included within their scope.

I claim:

1. In combination with a vehicle hauling compartment, having two spaced apart holes in one end, two spaced apart hook members secured to said compartment and near the end opposite from the end having said holes, a strand of chain secured to each of said hook members and extending through one of said holes respectively, a pin extending through one link of each of said chains for preventing the removal of said chains through said holes, and a plurality of cross chains extending between and secured to said first mentioned chains; said last mentioned chains having longer lengths as they progress at each side of the centrally positioned cross chains.

2. In combination with a vehicle hauling compartment, having two spaced apart holes in one end, two spaced apart hook members secured to said compartment and near the end opposite from the end having said holes, a strand of chain secured to each of said hook members and extending through one of said holes respectively, a pin extending through one link of each of said chains for preventing the removal of said chains through said holes, a plurality of cross chains extending between and secured to said first mentioned chains; said last mentioned chains having longer lengths as they progress at each side of the centrally positioned cross chains, and a plurality of chains transversely arranged relative to said cross chains and secured to said cross chains; said last mentioned chains progressing in length as they extend at each side of their shortest strand.

3. In combination with a vehicle hauling compartment, a flexible chain net of substantial rectangular form having its outer chain strands acting as its sole marginal rim edges, and a means for tightening and securing said flexible chain net to the floor of said vehicle hauling compartment.

4. In combination with a vehicle hauling compartment, two spaced apart strands of chain secured at their ends to said compartment, and a plurality of spaced apart cross chains extending between and secured to said spaced apart strands of chain; said cross chains having longer lengths as they progress at each side of the centrally positioned cross chains.

5. In a detachable sure-footing appliance for vehicle floor compartments, comprising two spaced apart side strands of chain adapted to have their ends tightly secured to the floor of a vehicle compartment, a plurality of transversely arranged spaced apart strands of cross chains extending between and secured to said first-mentioned chains; said cross chains having longer lengths as they progress at each side of the centrally positioned cross chains, and a plurality of spaced apart strands of chains transversely arranged relative to said cross chains and secured to said cross chains; said transversely arranged chains progressing in length as they extend at each side of their shortest strand.

BENTON FRANKLIN JENSEN.